O. SIMPSON.

HARVESTER.

No. 10,354. Reissued July 10, 1883.

WITNESSES:
A. G. Adamson
L. A. Adamson

O. Simpson
INVENTOR.
Chas. E. Adamson
HIS ATTY.

N. PETERS, Photo-Lithographer, Washington, D. C.

UNITED STATES PATENT OFFICE.

ORIN SIMPSON, OF TAMPICO, INDIANA.

HARVESTER.

SPECIFICATION forming part of Reissued Letters Patent No. 10,354, dated July 10, 1883.

Original No. 256,751, dated April 18, 1882. Application for reissue filed March 10, 1883.

*To all whom it may concern:*

Be it known that I, ORIN SIMPSON, a citizen of the United States, residing at Tampico, in the county of Howard and State of Indiana, have invented a new and useful Improvement in Harvesters, of which the following is a specification.

The object of my improvement is to facilitate the moving of harvesters from place to place. I attain this object by the mechanism illustrated in the accompanying drawings, in which—

Figure 1:
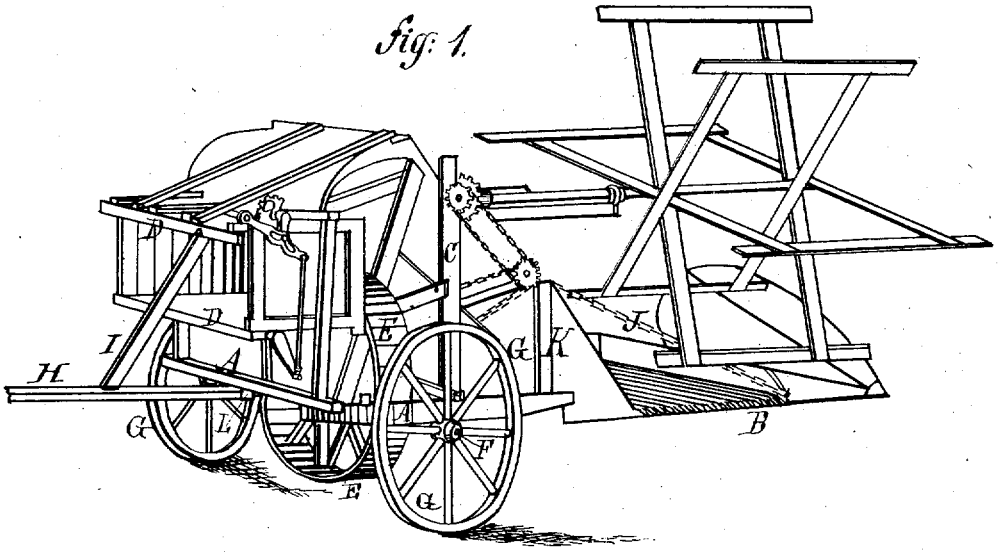
Figure 2:
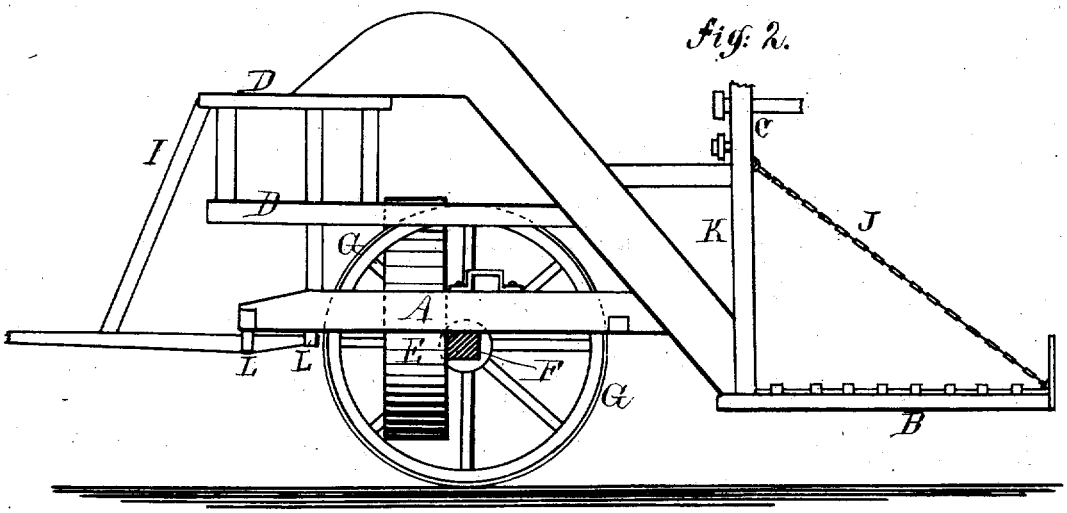

Figure 1 is a perspective view of a harvester to which my improvement has been applied, and Fig. 2 is an elevation of the same, partly in section.

In the drawings, the frame A, finger-bar B, reel-post C, binder-frame D, and the drive-wheel E are all common parts of a harvester, and are constructed in the ordinary manner.

The axle F is made of a length sufficient to cross the harvester alongside the drive-wheel E, and it is made of suitable material and of such a size as to readily support the said harvester. The wheels G G are placed on the ends of the said axle F, so that the operator can raise the wheel E, throwing the weight of the harvester on said wheels G G, and allowing the drive-wheel to pass over ordinary obstructions, as shown in Fig. 2. The axle F is placed under and across the frame A, and it may be secured in place by bolts, clamps, or other suitable means.

The tongue H is detached from the ordinary tongue-fastening and inserted in the extra tongue-fastenings L, which are attached to the under side of the inner side girt of the frame A, as shown.

With this improvement, when a harvester is to be drawn from place to place, the draft is applied and the harvester drawn in the direction of its longest dimension, so that it can readily pass along narrow roads and through narrow passages, where it could not pass if drawn upon its own wheels in the ordinary manner.

The tongue H is strengthened in place by the brace-bar I, the lower end of which is attached to the said tongue, and its upper end is attached to the binder-frame D.

To the outer part of the finger-bar B is attached the outer end of the chain J, the inner end of which is attached to the reel-post C, or to its supporting-frame K. The chain J thus serves to support the finger-bar when it is raised from the ground.

When the harvester is to be taken from one place to another, the operator takes hold of the outer end of the finger-bar B and raises it until the binder-frame D rests upon the ground. The tongue H is detached and the truck G G F is placed beneath the harvester, at the inner side of the drive-wheel E. The outer end of the finger-bar is then let down, (thereby raising the part on the other side of the truck,) and the machine is balanced upon the truck G G F. The drive-wheel is thereby raised, so that it will pass over ordinary obstructions. The tongue H is secured in the fastenings L and the grain-wheel is detached. The brace-bar I and chain J are then attached, when required, and the machine is ready to be moved.

Having thus described my invention, I claim the following and desire to secure the same by Letters Patent—

1. The combination, with the frame of a harvester, of a transverse axle secured thereto, near the end of said frame, wheels adapted to be mounted on said axle, and a draft-tongue adapted to be secured to the side girt of the frame, whereby the harvester may be moved endwise, substantially as set forth.

2. The combination, with a harvester-frame and drive-wheel, of an axle arranged parallel to the end of said frame, wheels removably mounted on said axle, and a tongue removably secured to the end of the frame, and braced thereto, whereby the drive-wheel may be elevated above the ground to allow the machine to be moved endwise, substantially as set forth.

3. The combination, with the frame of the harvester, of an axle secured thereto and carrying a ground-wheel, said axle being adapted to be raised with the frame to elevate said ground-wheel, an axle arranged parallel with the end of the frame, and having spindles adapted to receive removable wheels, and a draft-tongue adapted to be secured to the end of the frame, substantially as set forth.

4. The combination, with a harvester, of the axle F and wheels G G, the tongue H, attached to the outer side girt of the frame A, a brace-bar, I, and chain J, substantially as set forth.

ORIN SIMPSON.

Witnesses:
JEHU C. PICKETT,
ANDERSON TOMS.